United States Patent

[11] 3,551,706

[72] Inventor Richard M. Chapman
Columbus, Ohio
[21] Appl. No. 767,619
[22] Filed Oct. 15, 1968
[45] Patented Dec. 29, 1970
[73] Assignee F. W. Bell, Inc.
Columbus, Ohio
a corporation of Ohio

[54] HALL EFFECT DEVICE CONFIGURATIONS FOR EXTENDED FREQUENCY RANGE
17 Claims, 7 Drawing Figs.

[52] U.S. Cl. .......... 307/309, 324/45, 338/32
[51] Int. Cl. .......... G01r 33/06
[50] Field of Search .......... 324/45; 307/309; 338/32H

[56] References Cited
UNITED STATES PATENTS

| | | | |
|---|---|---|---|
| 3,213,359 | 10/1965 | Freytag et al. .......... | 324/45 |
| 3,296,573 | 1/1967 | Heid et al. .......... | 338/32(H) |

OTHER REFERENCES

Kemp; HALL EFFECT INSTRUMENTATION; 1963; Howard Wisams & Co.; pp. 115-117.

*Primary Examiner*—Alfred E. Smith
*Attorney*—Anthony D. Cennamo

ABSTRACT: The invention is for an improved means of measuring the Hall voltage produced in a Hall effect semiconductor plate by an alternating magnetic field. In particular, the invention relates to a means of compensating for the induced pickup in the output lead connections to the Hall plate. The useful frequency range of the Hall effect semiconductor is thereby extended.

INVENTOR.
RICHARD M. CHAPMAN
BY
Anthony D. Cennamo
ATTORNEY

*INVENTOR.*
RICHARD M. CHAPMAN

BY
Anthony D. Cennamo
ATTORNEY

2 LAYER, 1 TURN LOOP HALL GENERATOR

2 LAYER, 2 TURN LOOP HALL GENERATOR

UPPER LAYER

LOWER LAYER

INVENTOR.
RICHARD M. CHAPMAN

BY

ATTORNEY

HALL EFFECT DEVICE CONFIGURATIONS FOR EXTENDED FREQUENCY RANGE

BACKGROUND

The Hall effect is the voltage produced across opposite edges of an electrical current carrying conductor when placed in a magnetic field. The Lorentz force is the basis of this effect which depends upon deflection of charged particles moving in a magnetic field. This force is in a direction mutually perpendicular to the path of the particle's movement and the magnetic field direction. A voltage output results across the conductor whose magnitude depends upon the cross product of the excitation current and the magnetic field. If either input is zero the output will be zero. If the excitation current is held constant the output voltage is proportional to the magnetic field and, conversely, if the magnetic field is held constant the output voltage is proportional to the excitation current. Therefore the Hall effect has an inherent multiplying property.

The Hall plate has inherently a very wide frequency response. This characteristic permits the use of these devices in many applications. One such application is in the nondestructive testing of thin coatings, such as chrome, tin, nickel, copper or gold. This testing requires a device responsive to an alternating magnetic field in the megaHertz range. The prior art construction of Hall generators does not meet this requirement.

In use, a Hall generator comprises a layer of semiconductor material, the Hall plate, constructed upon a dielectric substrate. The semiconductor layer must, of necessity, be very thin to achieve high sensitivity. The dielectric substrate provides the necessary mechanical strength for the device. An excitation current is applied to the semiconductor by means of contacts positioned on opposite ends of the semiconductor plate. When the device is placed in a magnetic field and supplied with excitation current, there is produced in the semiconductor a Hall effect voltage which is orthogonal to the magnetic field and the excitation current. Therefore, to measure the Hall effect voltage there are attached to the semiconductor plate output leads which are positioned opposite to each other and on the axis of the produced Hall voltage. The output leads of the Hall generator, by necessity, are immersed in the magnetic field which is being sensed. If it is an alternating field, a signal will be induced into these leads by electromagnetic coupling. This produces unwanted E.M.F.'s which causes the output of the device to vary with changing field frequency. As the frequency of the alternating magnetic field increases the induced E.M.F. in the output leads becomes greater and greater with respect to the voltage produced by the Hall plate.

Various arrangements have been used in the past in an attempt to eliminate these undesirable induced E.M.F.'s. Among the techniques which have been utilized is the minimization of the inductive loops in the pickup leads, the use of three lead connection strips, the twisting of the output leads, etc. Acceptable responses which are flat within one-half db, are possible up to the order of 100 Khz. by these techniques. However, above that frequency range the unavoidable tolerances on lead placement cause pickup which cannot be well controlled in production.

SUMMARY OF THE INVENTION

The invention relates to a means for compensating for the undesired voltage induced in the output leads of a Hall generator. At high frequencies this voltage can become a substantial portion of the total output of a Hall generator. The present invention comprises a Hall plate which is constructed upon a substrate in any usual manner known to those versed in the art. The improvement comprises the addition of a loop(s) in the Hall voltage output leads and compensating circuitry to be described. In the preferred embodiment this loop(s) is mounted on the substrate in an area aligned with the normal sensitivity area of the Hall plate and in close proximity thereto. The loop(s) will thereby sense the same flux as that which impinges upon the Hall plate. The area of the loop should be large with respect to any loops formed by other lead connections. The output leads from the Hall generator including the loop(s) are then connected to a circuit which has a frequency response which is designed to complement the response produced by the interaction of the responses of the Hall plate and the pickup loop(s) to the impinging flux. This will provide a resultant output response from the circuit which is flat with frequency over very wide frequency changes.

The present invention solves several problems previously existent in the prior art. Rather than try to eliminate the voltages induced in the pickup leads, the present invention utilizes these voltages in a compensation circuit and thereby nullifies their effect. This means of dealing with the lead voltages is more effective than that of the prior art and greatly enhances the value of the Hall generator in many applications. As mentioned previously, the present state of the art is limited to frequencies not in excess of about 100 Khz. in order to have an acceptable response. With the present invention practical devices have been constructed with a flat response, within one-quarter db up to 4 MHz. Another advantage of the system is that the required bandwidth of the amplifying system connected to the Hall generator of the present invention is substantially less than the overall system bandwidth. This is helpful in the reduction of noise originating in the amplifier circuitry. The present invention is simple to construct, the compensation circuitry is inexpensive, and reliable performance is assured.

OBJECTS

Accordingly it is a principal object of the invention to provide an improved Hall device.

Another object of the invention is to provide a Hall generator which produces acceptable responses when measuring wideband alternating magnetic fields.

A further object of the invention is to provide a Hall generator and amplifying system which has wide range frequency response but also a low noise bandwidth.

Still a further object of the invention is to provide a Hall device with simple circuitry and thereby one which is inexpensive to construct.

For a complete understanding of the invention, together with other objects and advantages thereof, reference may be made to the accompanying drawings, in which:

DETAILED DESCRIPTION OF THE DRAWINGS

Figure 1:
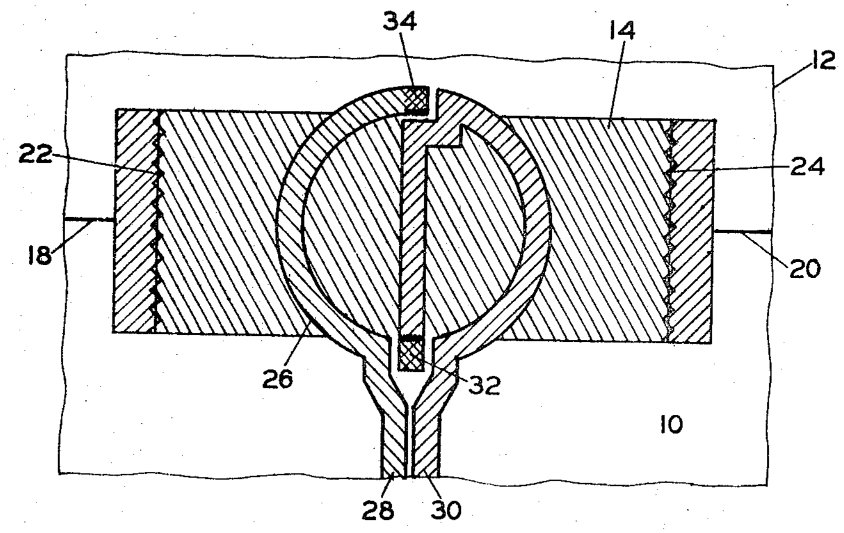
FIG. 1 is a diagrammatic top view of the preferred embodiment of the invention illustrating the configuration of the loop in the Hall voltage output leads and its positioning on the substrate.
Figure 1A:
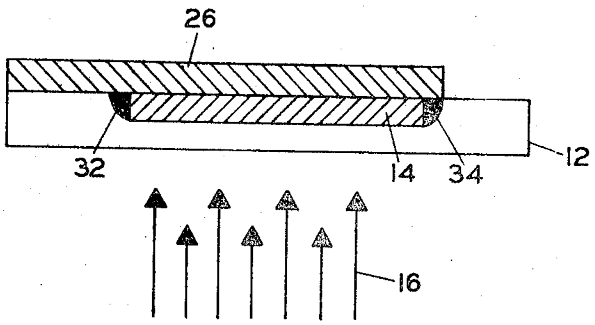
FIG. 1*a* is a side view of the preferred embodiment illustrated in FIG. 1 showing the spatial relationship of the various elements.

Referring to FIGS. 1 and 1*a* there is illustrated a preferred embodiment of the invention. The device 10 comprises a substrate support 12 on which is constructed a thin layer of semiconductor material 14 which possesses the characteristics required for the production of a Hall effect voltage when the generator 10 is placed in a magnetic field 16. For illustration purposes the flux lines of the magnetic field 16 are shown in FIG. 1*a* to be impinging upon the bottom of the Hall plate but this is not essential to the operation of the invention. The substrate support 12 is necessary to provide mechanical strength for the generator 10 and in addition to physically protecting the Hall plate 14 the support 12 also electrically insulates the plate 14. The Hall plate 14 is electrically excited by a current. The excitation current leads 18 and 20 are connected to the Hall plate 14 at diametrically opposite ends of the plate by contacts 22 and 24.

In application the Hall generator 10 is placed in the magnetic field 16 with the axis formed by the control current connections 22 and 24, normally positioned orthogonally to the field 16. In accordance with the Hall effect phenomena there will be produced a voltage in the plate 14 which is orthogonal to both the field 16 and the control current axis 24 and 22. Under the present invention, as illustrated in FIGS. 1 and 1*a*, the Hall voltage is removed from the Hall plate 14 by a loop configuration 26 of the Hall voltage leads 28 and 30. This loop 26 is placed on the substrate support 12 and is electrically connected to the plate 14 at points 32 and 34. It is important to the proper operation of the invention that this loop 26 be located so as to enclose the active sensitive area of the Hall plate 14. This permits both the loop 26 and the plate 14 to respond to the same impinging magnetic flux 16. It is also important in the design of the pickup loop 26, that the loop 26 has a substantially larger area than any other loop in the pickup leads 28 and 30. The reason for these last two limitations is that no attempt is made to reduce or cancel the induced intrinsic error voltage. It has been found that such cancellation on the substrate is limited by the geometric pattern accuracy on the substrate. Since it is not possible to reduce the cancellation to zero, or sufficiently low for practical use, the induced voltage on the substrate is increased. This is accomplished by pickup loop 26 which is a noncanceling loop and in which induced voltages are large.

The Hall generator 10 which has been described above is then connected to a compensation network and if desired an amplifier 36. These interconnections are shown in schematic form in FIG. 2*a*. At the high end of the frequency range (0 to 10 MHz.) there is a large enough signal produced by the Hall generator 10 that an amplifier might not be desired. In operation a frequency versus output plot of the Hall generator 10 illustrated in FIG. 1 is shown graphically in FIG. 3. This output $E_H+E_L$ schematic illustrated in FIG. 2 which is enclosed within the dotted circle. L is equivalent inductance of lead wire loops.

Figure 2A:
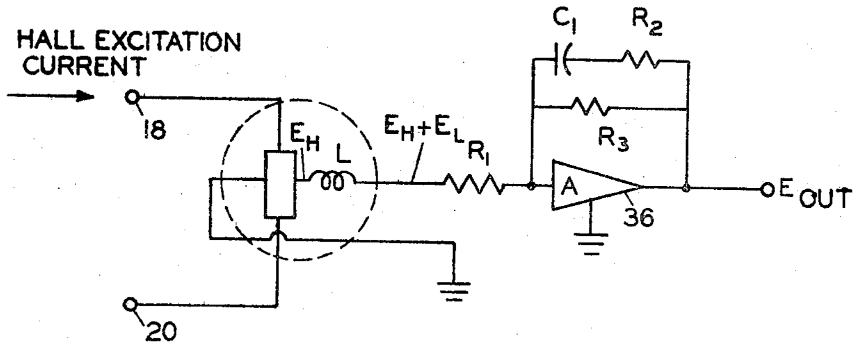
FIG. 2*a* is a schematic representation of the circuitry of the invention comprising a Hall generator, an amplifier, and a compensation network.

As can be seen the output of the generator 10, which is $E_H+E_L$ the frequency of the impinging magnetic field 16 increases the output of the coil 26 will increase in a relationship proportional to the increasing frequency. At the frequency point, $f_1$, the total device output will begin to increase. This increase will be at a rate of 20 db per decade as predicted by electromagnetic induction theory. The output will continue to increase at this rate until the coil reactance becomes equal to the total Hall output circuit load resistance, which is represented schematically as $R_1$. At this point, which is denoted $f_2$, the response will begin to level off. This leveling off is caused by the current which begins to flow in the loop 26. This coil current has the effect of reducing the total resultant field by means which are explained by Lenz's Law. As shown in FIG. 2*a* the output, $E_H+E_L$, of the generator 10 is connected to a compensation network and an amplifier 36. This portion of the circuit is necessary to produce a final output signal which is large enough to be useful and which properly compensated for the voltage induced in the Hall element 10. The amplifier 36 has a feedback loop which is adjusted to produce the desired complementing response. The values of resistors $R_1$ and $R_3$ determine the level of the low frequency gain. Capacitor $C_1$ is adjusted to make its reactance equal to the value of resistor $R_3$ at the frequency $f_1$. This will produce a rolloff starting at the same point that the coil, $E_L$, begins to produce an output. Resistor $R_2$ is then adjusted to equal the reactance of capacitor $C_1$ at frequency $f_2$ to stop the amplifier rolloff at this frequency.

Figure 2B:
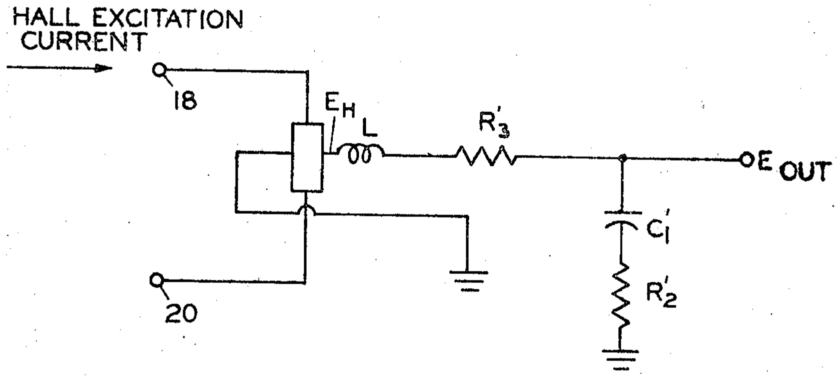
FIG. 2*b* is a schematic representation of the circuitry of the invention comprising a Hall generator and a simple resistor-capacitor compensation network.
Figure 3:
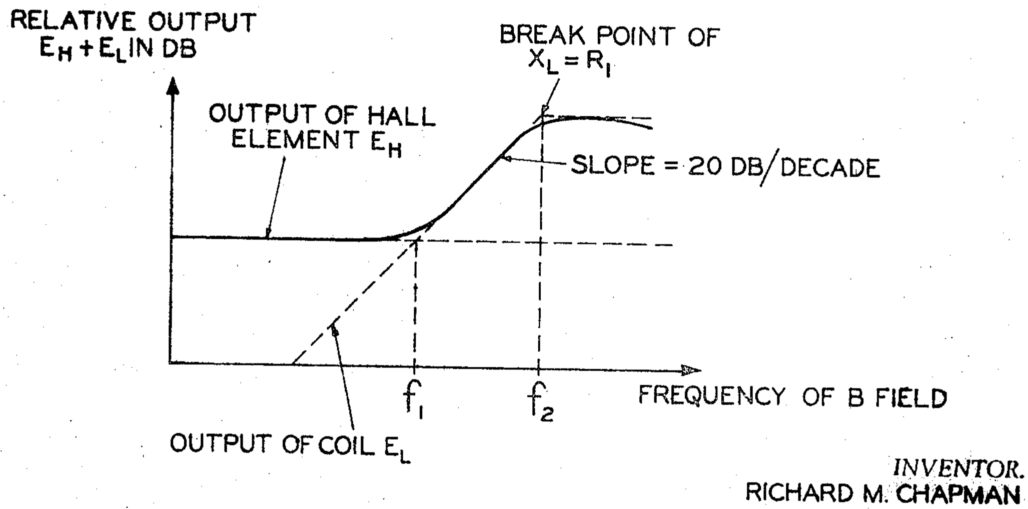
FIG. 3 is a graphical representation of the output of the preferred embodiment of the invention illustrated in FIG. 1 as a function of the frequency of the magnetic field impinging upon the preferred embodiment.

The compensation network may consist of only a single RC low pass filter as shown in FIG. 2*b* which has a single corner rolloff. By utilizing a variable resistor the corner is adjusted to match the corner of the response rise of the Hall generator 10 as shown in FIG. 3 at frequency $f_1$. This permits an inexpensive means for achieving a flat response from the device 10. Due to the simplicity of the network, the calibration of the compensating network for each individual Hall device is not difficult. This calibration is achieved in the following manner. Capacitor $C'_1$ is adjusted to make its reactance equal to the value of resistor $R'_3$ at the frequency $f_1$. This will produce a rolloff starting at the same point that the inductance (loops in lead pattern), $E_L$, begins to produce output. Resistor $R'_2$ is then adjusted to equal the reactance of capacitor $C'_1$ at frequency $f_2$ to stop the compensating network's rolloff at this frequency.

As was mentioned previously, the pickup area of the loop 26 must be in proper relation to the sensitivity area of the Hall plate 14. At frequencies above $f_1$ the system measures the induced output in the coil 26 as well as the Hall output. The induced E.M.F.'s in leads at areas other than the Hall plate 14 are not produced by the same flux that produces Hall voltage and consequently can produce errors if the field is not homogeneous. If the induced voltage at the loop 26 under the Hall plate 14 is much higher than the induced signals at the other locations in the lead wiring then the errors will be minimized by comparison. This is the reason for the requirement that the pickup loop 26 be much larger than any other loop in the leads 28 and 30.

The phase angle of the output response will change as the frequency is varied. At the lower frequencies, the phase angle will be zero degrees. As the frequency is increased the phase response will smoothly shift to a lead angle of 90°. As the frequency approaches $f_2$ the phase will shift back to 0°.

Figure 4:
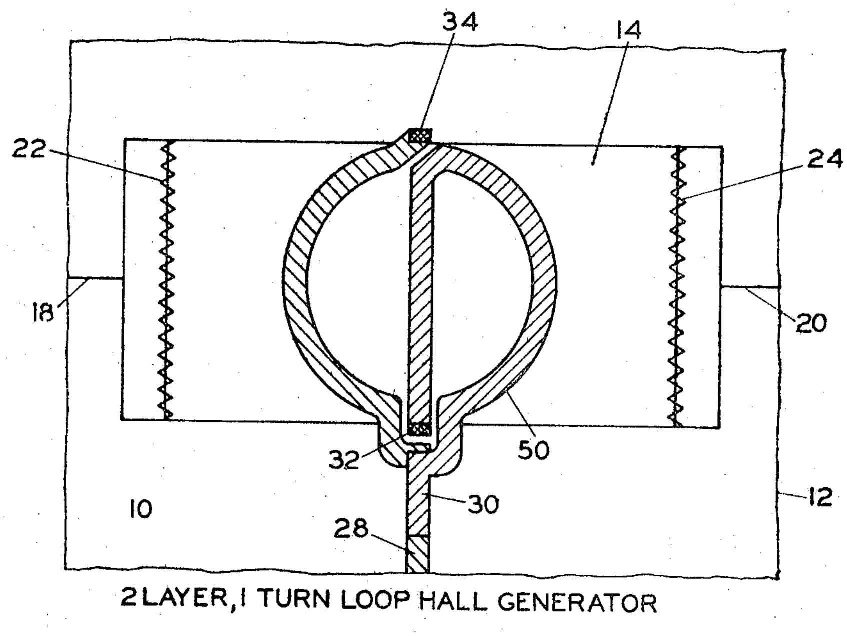
FIGS. 4 and 5 represent alternative embodiments of the invention.

An alternative embodiment of the invention is illustrated in FIG. 4. There is again a thin layer of Hall effect semiconductor material 14 constructed upon a substrate support 12. Control current connections, 22 and 24, are made at diametrically opposite ends of the semiconductor material 14. However, in this embodiment the Hall effect voltage pickup loop 50 is constructed as a two-layer pattern. This configuration was shown by test measurements to provide an improved amplitude response when the Hall generator was positioned such that the field 16 was not centered under the active portion of the Hall plate 14. Therefore by utilizing this embodiment the effect of stray pickup in leads other than the loop 50 is reduced to a minimum.

Figure 5:
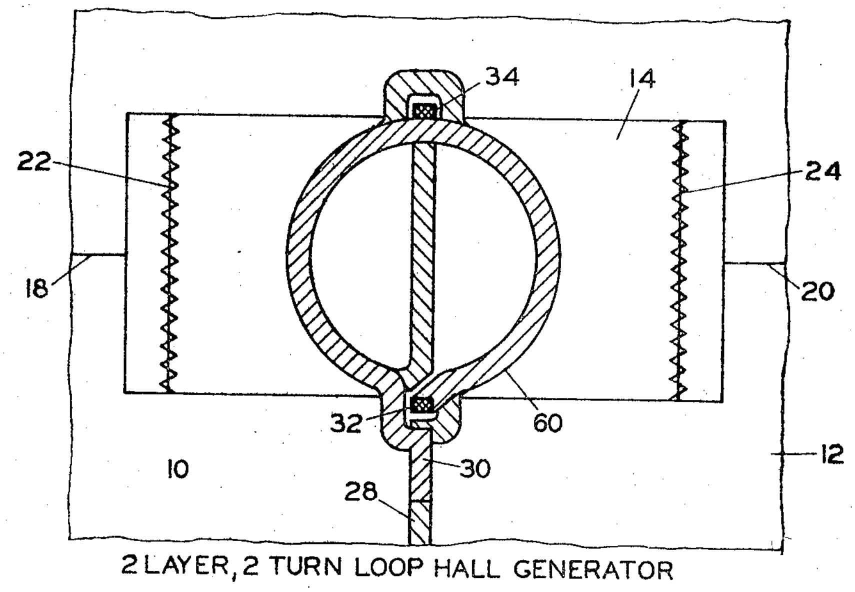

FIG. 5 illustrates another embodiment which will also substantially reduce the effect of stray pickup. In this configuration the primary elements are the same as in the first two embodiments. The Hall effect voltage pickup is now constructed as a multiturn loop 60. The compensation network would be the same as that employed previously and the stray pickup would again be attenuated as the area of loop pickup 60 is in effect multiplied by the number of turns making it larger than the area of loops in the other leads further minimizing their influence.

By employing the principles and techniques taught by this disclosure one could theoretically extend the frequency limits of a Hall generator to the upper limits of the amplifying system. This could be in the range of 20 MHz. to 50 MHz. or above. The Hall generator would thereby become of great use in the field of nondestructive testing as well as other magnetic field measuring applications.

Although certain and specific embodiments have been illustrated, it is to be understood that modifications may be made without departing from the true spirit and scope of the invention.

I claim:

1. A Hall device comprising a thin flat substrate formed of a dielectric material having a pair of oppositely disposed substantially flat surfaces thereon; a Hall plate in the form of a semiconductor material exhibiting the Hall effect phenomena; said Hall plate deposited upon one of said substrate's substantially flat surfaces; means for electrically extracting the Hall voltage produced in said Hall plate by impinging electromagnetic energy, said last named means including means for increasing the induced voltages; means external of said Hall device including an electrical circuit for compensating for the voltages induced in said extracting means by said impinging electromagnetic energy; and means including electrical conductive leads for electrically exciting said Hall plate with an excitation current.

2. A Hall device as set forth in claim 1 wherein said compensating means comprises a low-pass filter with a single corner rolloff.

3. A Hall device as set forth in claim 2 wherein said low-pass filter comprises resistors and capacitors in combination.

4. A Hall device as set forth in claim 2 wherein said compensation means further comprises an amplifier utilizing said filter as a feedback loop.

5. A Hall device as set forth in claim 1 wherein said electrically conductive leads are constructed in an area enclosing configuration which permits said leads to have a voltage induced in said leads by said impinging electromagnetic energy, said configuration encompassing the active portion of said Hall plate.

6. A Hall device as set forth in claim 5 wherein said leads have induced voltages substantially larger than the voltages induced in other portions of said devices electrical wiring.

7. A Hall device including a compensation network and a Hall generator comprising a thin flat substrate formed of a dielectric material having a pair of oppositely disposed substantially flat surfaces thereon; a Hall plate in the form of a semiconductor material exhibiting the Hall effect phenomena; two electrically conductive leads each having the form of a semicircle, the first of said leads further comprising a straight section extending from the first end of said semicircle in the direction of the second end of said semicircle, said straight section having a length less than the diameter of said loops thereby preventing the physical and electrical closing of said first semicircle; said semicircular leads arranged in the form of a circle and electrically insulated one from the other; said electrically conductive leads positioned adjacent to said Hall plate; said leads and said Hall plate arranged upon said substrate on one of said substrate's substantially flat surfaces; said semicircular leads electrically connected to said Hall plate at the end of said straight section of said first lead and at the first end of said second lead, means for electrically connecting the second end of each of said leads to said compensation network; and means for electrically exciting said Hall plate with an excitation current.

8. A Hall device as set forth in claim 7 wherein said circle formed by said semicircular leads is positioned to encompass the active portion of said Hall plate.

9. A Hall device as set forth in claim 7 wherein said means for electrically connecting the second end of each of said leads to said compensation network comprises electrically conductive leads insulated one from the other and positioned one over the other at the edge of said Hall plate.

10. A Hall device as set forth in claim 7 wherein said compensating network comprises a low-pass filter with a single corner rolloff.

11. A Hall device as set forth in claim 10 wherein said low-pass filter comprises resistors and capacitors in combination.

12. A Hall device as set forth in claim 10 wherein said compensation means further comprises an amplifier utilizing said filter as a feedback loop.

13. A Hall device including a compensation network and a Hall generator comprising a thin flat substrate formed of a dielectric material having a pair of oppositely disposed substantially flat surface thereon; a Hall plate in the form of a semiconductor material exhibiting the Hall effect phenomena; two electrically conductive leads each having the form of a plurality of loops, said loops electrically insulated one from the other, the first of said leads further comprising a straight section extending from the first end of said loops diametrically across said loops, said straight section having a length less than the diameter of said loops thereby preventing the physical and electrical closing of said loops; said electrically conductive loops positioned one over the other and positioned adjacent to said Hall plate; said leads and said Hall plate arranged upon said substrate on one of said substrate's substantially flat surfaces; said leads electrically connected to said Hall plate at the end of said straight section of said first lead and at the first end of said second lead; means for electrically connecting the second end of each of said leads to said compensation network; and means for electrically exciting said Hall plate with an excitation current.

14. A Hall device as set forth in claim 13 wherein said means for electrically connecting the second end of each of said leads to said compensation network comprises electrically conductive leads insulated one from the other and positioned one over the other at the edge of said Hall plate.

15. A Hall device as set forth in claim 13 wherein said compensating network comprises a low-pass filter with a single corner rolloff.

16. A Hall device as set forth in claim 15 wherein said low-pass filter comprises resistors and capacitors in combination.

17. A Hall device as set forth in claim 15 wherein said compensation network further comprises an amplifier utilizing said filter as a feedback loop.